Jan. 14, 1947.  J. H. EWERT  2,414,292
TOOL GUIDE
Filed April 7, 1945
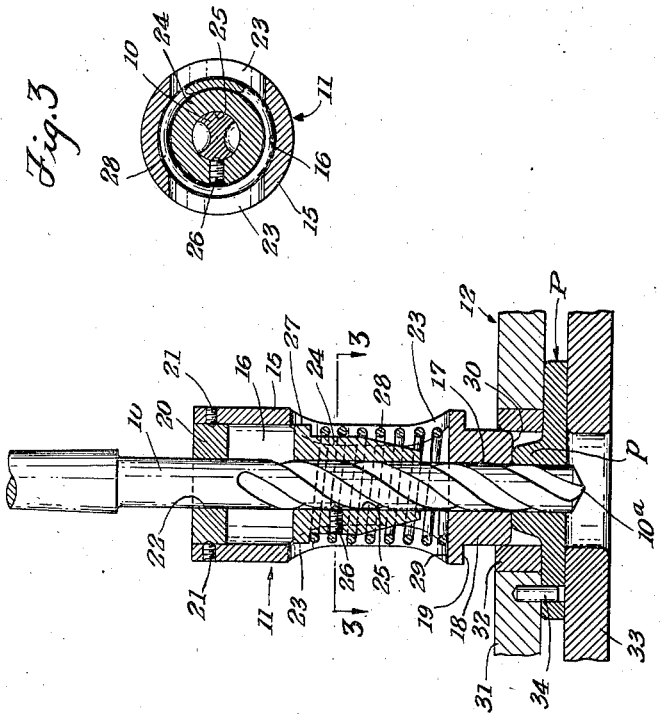
INVENTOR.
JOHN H. EWERT
BY
ATTORNEY Patented Jan. 14, 1947

2,414,292

UNITED STATES PATENT OFFICE 2,414,292

TOOL GUIDE

John H. Ewert, Los Angeles, Calif.

Application April 7, 1945, Serial No. 587,107

2 Claims. (Cl. 77—55)

This invention relates to tool guiding means and relates more particularly to means for guiding drills, and the like.

The drilling of certain work is greatly facilitated if the drill jig which holds said work or work-piece can receive and hold the same in either of two positions. If a work-piece which has two positions in its jig, also presents the surface to be entered by the drill at two different levels with respect to the drill point, accuracy in drilling is lost when the work-piece is presented to the drill with the surface or face to be entered by the drill remote from the drill point. Wandering of the drill point is apt to occur. An example of such a work-piece would be a disc-like member having a central boss on one side thereof. Further, it may be desired to drill such a work-piece part way in from each side face, in which case a two-position jig would be desired for purposes of economy.

This invention has for its primary object to provide simple and effective means for accurately guiding a drill for entering a work-piece in which the surface or face of said work-piece to be entered by the drill may be spaced at different levels with respect to the drill point.

Another object of the present invention is to provide novel means for guiding a drill, or the like, for drilling a hole in a piece of work quickly and accurately.

Another object of the invention is to provide simple, inexpensive and durable means for guiding a drill with respect to a work-piece whereby an accurately placed hole is drilled in said workpiece.

Another object of the invention is to provide means for guiding the point of a drill, or the like, at a point close to a work-piece to be drilled, to hold said drill point steady at the beginning of the drilling operation, and to continually guide the drill during said drilling operation.

A further object of the invention is to provide drill guiding means whereby the drill point is guided to prevent wandering of said point at the beginning of a drilling operation under varying height conditions of work-pieces supported in a jig or fixture.

The various objects and features of my invention will be fully understood from the following detailed description of a typical preferred form and application of the invention, throughout which description reference is made to the accompanying drawing, in which:

Fig. 1 is an elevational view, partly in cross-section, of means for guiding a drill according to the present invention.

Fig. 2 is a longitudinal sectional view of the means shown in Fig. 1 in another application thereof.

Fig. 3 is a cross-sectional view as taken on the line 3—3 of Fig. 2.

The invention, as hereinafter described, is applied to a drill. No limitation is this regard is intended since other tools of like nature may be guided with equal efficacy. Further, the terms used herein and the specific details of the invention as illustrated, are intended to disclose a preferred embodiment of the invention. This disclosure, therefore, should be considered as exemplary only of the invention.

In the embodiment of the invention which is illustrated, a drill 10 carries drill guiding means 11, and said guiding means, in turn, having piloting engagement with a jig or fixture 12.

The drill guiding means 11 may comprise a cage 15 which is preferably formed as a cylindrical body member which forms a longitudinal chamber 16 terminating at one end in a bore 17 in which the drill 10 may both rotate and move axially. The bore 17 is formed in the lower end wall 29 of the cage, which wall is integrally joined with and closes the lower end of the cylindrical body. The end of the cage around the bore 17 and below the end wall 29 is preferably reduced in diameter to provide a pilot 18 and to form an abutment shoulder 19 on the cage for operative engagement with the jig or fixture 12. The other or upper end of the cage is fitted with a closure disc 20 set into the upper end of the cylindrical body. The disc 20 is held securely but removably as by means of set screws 21 carried in the body and impinging on the peripheral wall of the disc 20. Said disc 20 has a central axial bore 22 in which the drill 10 is guided. In this manner two spaced portions of the drill are engaged by holes 17 and 22 of the guiding means 11 for rotation and axial movement in the body of the cage. The cage 15 is provided with side openings 23 affording access, without dis-assembly, to the chamber 16 of the cage for cleaning out chips, etc.

The drill guiding means may further include a collar 24 having a central longitudinal bore 25 whereby said collar may be mounted on the drill 10 at an intermediate point between the drill guiding bores 17 and 22 and within the chamber 16. Said collar may be adjustably held in position as by a set screw 26 carried by the collar and impinging the drill 10. The collar has a flange 27 at its upper end to serve as an abutment for the upper end of compressible means such as a coil spring 28, the other end of said spring being supported on a wall 29 which defines the bottom of the chamber 16.

In practice, the guiding means 11 may be mounted on the drill 10 so that when the collar 24 abuts the lower face of the closure disc 20, the face 30 of the cage which comprises the end of the pilot 18 is positioned slightly above the drill point 10a as seen in Fig. 1.

The guiding means 11 above set forth may be applied to a jig or fixture such as shown at 12 and which may comprise a drill plate 31 having a guide bushing 32 mounted therein, work clamping means which includes a clamp plate 33, and means such as a pin or pins 34 for guiding desired positioning in said jig of a work-piece such as shown at P.

The components of the drill jig 12 may vary as can be understood but, in this instance, it is desired that the guide bushing 32 have a height approximating that of the pilot 18 of the drill guiding means 11, and that the hole in said bushing be of sufficiently large diameter to accommodate the boss p of the work-piece P.

Inasmuch as the instrumentalities of the invention are more particularly intended to be used in high production work for drilling holes in large quantities of work-pieces P, the proportions of the various elements of the guiding means 11 and the jig 12 may be suitably designed. Thus, the height of the guide bushing 32 and of the pilot 18 will depend upon the height of the boss p of the work-piece, and the diameter of the hole in said guide bushing and, consequently, the diameter of the pilot 18 will depend on the diameter of said boss p.

With the foregoing in mind, particular reference is made to Fig. 1. The work-piece P is shown with its boss p disposed remotely with respect to the drill point 10a. In this condition the drill point is effectively guided against wandering by the piloting and steadying engagement of the pilot 18 in the guide bushing 32. It may be seen that the guiding means thus provided presents the drill point 10a directly to the upper surface of the work-piece P with no unsupported extension of the drill.

Referring to Fig. 2, where the workpiece P is shown with its boss presented to the drill point and residing in the bore of the guide bushing 32, the pilot 18 is arranged for steadying engagement in the bore of said bushing as above set forth. In the arrangement of Fig. 1, the pilot 18 extends substantially entirely into the guide bushing bore until the shoulder 19 engages the top face of said bushing. In the arrangement of Fig. 2, the pilot has partial engagement with said bushing but, nevertheless, ample for the purpose.

In the above manner either the shoulder 19 or the face 30 of the guiding means 11 provides the abutment for the cage 15 as the drill is pressed down to perform its function. As the drilling progresses, the collar 24 compresses the spring 28 to store up sufficient energy therein so that upon extraction of the drill from the work-piece P, the cage will be restored to its initial position with respect to the drill.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A drill guide including a cylindrical body with side openings, a lower end wall integral with the body and closing the lower end thereof, a closure extending into the upper end of the body, means carried by the body retaining the closure in place, the closure and said wall having aligned openings passing a drill, a collar on the drill and in the body between said wall and closure, means carried by the collar and accessible through the side openings setting the collar on the drill, and means acting between the collar and said wall normally yieldingly urging the body downwardly.

2. A drill guide including a cylindrical body with side openings, a lower end wall integral with the body and closing the lower end thereof, the said wall having an exterior on its lower side forming a guide, a closure extending into the upper end of the body, means carried by the body retaining the closure in place, the closure and said wall having aligned openings passing a drill, a collar on the drill and in the body between said wall and closure, the collar having a downwardly facing shoulder at its upper end, means carried by the collar and accessible through the side openings setting the collar on the drill, and a coil spring surrounding the collar and acting under compression between the shoulder and the said wall to normally yieldingly urge the body downwardly.

JOHN H. EWERT.